(12) United States Patent
Adachi et al.

(10) Patent No.: US 9,524,811 B2
(45) Date of Patent: Dec. 20, 2016

(54) WIRE HARNESS

(75) Inventors: Hideomi Adachi, Kosai (JP); Hidehiko Kuboshima, Kosai (JP)

(73) Assignee: YAZAKI CORPORATION, Tokyo (JP)

( * ) Notice: Subject to any disclaimer, the term of this patent is extended or adjusted under 35 U.S.C. 154(b) by 33 days.

(21) Appl. No.: 13/817,066

(22) PCT Filed: Jul. 27, 2011

(86) PCT No.: PCT/JP2011/067160
§ 371 (c)(1),
(2), (4) Date: Feb. 14, 2013

(87) PCT Pub. No.: WO2012/026272
PCT Pub. Date: Mar. 1, 2012

(65) Prior Publication Data
US 2013/0140055 A1  Jun. 6, 2013

(30) Foreign Application Priority Data
Aug. 24, 2010 (JP) .................................. 2010-186804

(51) Int. Cl.
*H01B 7/00* (2006.01)
*B60R 16/02* (2006.01)

(52) U.S. Cl.
CPC ......... *H01B 7/0045* (2013.01); *B60R 16/0215* (2013.01)

(58) Field of Classification Search
None
See application file for complete search history.

(56) References Cited

U.S. PATENT DOCUMENTS

| | | | | |
|---|---|---|---|---|
| 1,992,392 A | * | 2/1935 | Rah .......................... | H02G 5/06 174/129 B |
| 3,422,213 A | * | 1/1969 | Boodley .................. | H01B 5/02 174/126.1 |

(Continued)

FOREIGN PATENT DOCUMENTS

| CN | 201303237 Y | 9/2009 |
|---|---|---|
| CN | 201478466 U | 5/2010 |

(Continued)

OTHER PUBLICATIONS

Extended European Search Report, dated Mar. 25, 2014, issued by the European Patent Office in counterpart European Patent Application No. 11819737.5.

(Continued)

*Primary Examiner* — Hoa C Nguyen
*Assistant Examiner* — Stanley Tso
(74) *Attorney, Agent, or Firm* — Sughrue Mion, PLLC

(57) ABSTRACT

A wire harness which can absorb a position shift or a dimensional tolerance related to mounting or the like sufficiently is provided. A wire harness (21) includes a harness body (22), a motor side connector (23) provided at one end of the harness body (22), and an inverter side connector (24) provided at the other end of the harness body (22). The harness body (22) includes high voltage conduction paths (25), and an electromagnetic shielding member (26) which collectively covers the high voltage conduction paths (25). The high voltage conduction path (25) includes a conductor body (27), connecting parts (28, 29) and a mold part (30). The conductor body (27) is provided with a tolerance absorbing part (31).

8 Claims, 17 Drawing Sheets

(56) References Cited

U.S. PATENT DOCUMENTS

| | | | |
|---|---|---|---|
| 3,544,706 A | | 12/1970 | Aupoix |
| 4,051,383 A | * | 9/1977 | Dola ............................. 307/11 |
| 4,870,308 A | * | 9/1989 | Sismour, Jr. ............. H02K 3/51 |
| | | | 174/99 E |
| 5,039,896 A | * | 8/1991 | Adams .................. H02K 19/38 |
| | | | 310/180 |
| 5,530,216 A | * | 6/1996 | Benke ................. H01H 1/5822 |
| | | | 200/50.21 |
| 5,742,484 A | * | 4/1998 | Gillette ................. H05K 1/148 |
| | | | 174/106 R |
| 6,031,730 A | * | 2/2000 | Kroske ................. H01R 9/096 |
| | | | 361/784 |
| 6,929,504 B2 | * | 8/2005 | Ling .................... H01M 2/202 |
| | | | 361/710 |
| 7,339,112 B2 | | 3/2008 | Itou et al. |
| 8,574,008 B2 | * | 11/2013 | Große .................. H01M 2/202 |
| | | | 439/627 |
| 8,895,865 B2 | * | 11/2014 | Lenahan .............. H05K 1/0215 |
| | | | 174/254 |
| 2002/0179318 A1 | * | 12/2002 | Seo ............................. 174/71 R |
| 2003/0040215 A1 | * | 2/2003 | Kleen ..................... H01R 4/70 |
| | | | 439/510 |
| 2006/0254800 A1 | | 11/2006 | Itou et al. |
| 2008/0173463 A1 | | 7/2008 | Yamada et al. |
| 2008/0257580 A1 | * | 10/2008 | Ishimoto ...................... 174/68.1 |

FOREIGN PATENT DOCUMENTS

| | | |
|---|---|---|
| CN | 201478763 U | 5/2010 |
| DE | 20 2009 009 607 U1 | 10/2009 |
| GB | 1181449 A | 2/1970 |
| JP | 61201210 U | 12/1986 |
| JP | 62105309 A | 5/1987 |
| JP | 62-147214 U | 9/1987 |
| JP | 01-307109 A | 12/1989 |
| JP | 02-064162 U | 5/1990 |
| JP | 02-126957 U | 10/1990 |
| JP | 06-036620 A | 2/1994 |
| JP | 06-077116 U | 10/1994 |
| JP | 08-180740 A | 7/1996 |
| JP | 9259648 A | 10/1997 |
| JP | 11-007834 A | 1/1999 |
| JP | 2004-055197 A | 2/2004 |
| JP | 2005-310447 A | 11/2005 |
| JP | 2008177111 A | 7/2008 |
| JP | 2008-253017 A | 10/2008 |
| JP | 2011-113928 A | 6/2011 |
| JP | 2011-258783 A | 12/2011 |
| WO | 2011/155581 A1 | 12/2011 |

OTHER PUBLICATIONS

Office Action dated Jan. 6, 2015, issued by the Japanese Intellectual Property Office in counterpart Japanese Application No. 2010-186804.

Office Action and Search Report, Issued by the State Intellectual Property Office of P.R. China, Dated Oct. 28, 2014, in counterpart Chinese application No. 201180041090.3.

International Search Report for PCT/JP2011/067160, dated Nov. 1, 2011 [PCT/ISA/210].

Written Opinion for PCT/JP2011/067160, dated Nov. 1, 2011 [PCT/ISA/237].

Communication issued on Aug. 7, 2015 by the European Patent Office in related Application No. 11819737.5.

Office Action dated May 14, 2015, issued by the State Intellectual Property Office of P.R. China in counterpart Chinese Application No. 201180041090.3.

Office Action issued Nov. 18, 2015, issued by the State Intellectual Property Office of the People's Republic of China in counterpart Chinese Patent Application No. 201180041090.3.

Communication dated May 13, 2016, issued by the State Intellectual Property Office of the People's Republic of China in counterpart Chinese Application No. 201180041090.3.

Notice of Rejection Decision dated Sep. 5, 2016, issued by the State Intellectual Property Office of P.R. China in counterpart Chinese Application No. 201180041090.3.

* cited by examiner (a)        (b)

WIRE HARNESS

TECHNICAL FIELD

The present invention relates to a wire harness which is provided with a conduction path including a conductor body and connecting parts.

BACKGROUND ART

An electric vehicle or a hybrid vehicle is provided with a motor used as the source of power, an inverter that generates a three-phase alternating current required for the drive of the motor, and a wire harness which connects the motor and the inverter.

A wire harness disclosed in Patent Literature 1 includes a harness body which contains a plurality of high voltage electric wires, a motor side connecting part which is provided at one end of the harness body and which is attached to a connecting part of a motor, and an inverter side connecting part which is provided at the other end of the harness body and which is attached to a connecting part of an inverter.

In the wire harness disclosed in Patent Literature 1, since the motor and the inverter are mounted separately, the harness body is formed to be comparatively long. When the motor and the inverter are closely mounted, naturally the length of the harness body becomes shorter. As the length of the harness body becomes shorter, the rigidity of a thick wire harness containing a plurality of high voltage electric wires becomes higher.

CITATION LIST

Patent Literature

Patent Literature 1: JP-A-2008-253017

SUMMARY OF INVENTION

Technical Problem

When devices such as the motor and the inverter are closely mounted, and the rigidity of the wire harness which electrically connects the motor and the inverter becomes very high, if a shift occurs to mounting positions or the like, or a dimensional tolerance is large, there is a possibility that the electric connection by the wire harness may become difficult.

The present invention is made in view of the above-mentioned situation, and a technical problem of the invention is to provide a wire harness so that a position shift or a dimensional tolerance related to mounting or the like can be absorbed sufficiently.

Solution to Problem

The above problem of the invention is solved with any of the following configurations.

(1) A wire harness, including: a conduction path including a conductor body and connecting parts provided at one end and the other end of the conductor body; and a tolerance absorbing part which is provided in the conductor body, wherein the tolerance absorbing part is formed to allow a position of one connecting part provided at either of the one end and the other end of the conductor body to be displaced in X, Y and Z directions in a state where the other connecting part is fixed, and to hold a displaced state of the conduction path after a displacement.

The wire harness according to the configuration (1), wherein the tolerance absorbing part is formed into any one of a mountain shape, a wavy shape and a twisted shape, and/or the tolerance absorbing part is formed by crushing the conductor body.

The wire harness according to the configuration (2), wherein a slit which extends in a direction which is substantially perpendicular to a conductor width direction is formed at a center of the tolerance absorbing part in the conductor width direction.

The wire harness according to any one of the configurations (1) to (3), wherein a mold part which has insulation property and flexibility is provided outside the conductor body including the tolerance absorbing part.

The wire harness according to any one of the configurations (1) to (4), wherein a plurality of conduction paths including the conduction path are aligned so that the tolerance absorbing parts of the plurality of conduction paths are arranged substantially in the same position, and mounting parts which include the connecting parts are provided at ends of the plurality of conduction paths.

According to the wire harness of the above configuration (1), by providing a tolerance absorbing part in the conductor body in the conduction path, the position of the one connecting part can be displaced in the X, Y and Z direction (X axis direction, Y axis direction and Z axis direction in a Cartesian coordinate system) in a state where, for example, the connecting part of the conduction path at the other end side is fixed. Further, the displaced state of the conduction path after a displacement can be held with the tolerance absorbing part. Therefore, an effect is achieved that while a position shift or dimensional tolerance related to mounting or the like can be sufficiently absorbed, the state of absorbing the position shift or dimensional tolerance can be maintained.

According to the wire harness of the above configuration (2), an effect is achieved that, regarding the shape of the tolerance absorbing part, a better form can be provided.

According to the wire harness of the above configuration (3), an effect is achieved that by forming the slit in the tolerance absorbing part, it can be easier to displace. Thereby, an effect is also achieved that operability can be improved.

According to the wire harness of the above configuration (4), an effect is achieved that by providing the mold part outside the conductor body containing the tolerance absorbing part, protection, waterproofing or the like can be carried out simply irrespective of the shape of the conductor body. Further, an effect is achieved that since the mold part is provided after providing the tolerance absorbing part by machining the conductor body and/or after forming the slit or the like in the tolerance absorbing part, manufacturability of the conduction path can be made preferable.

According to the wire harness of the above configuration (5), the wire harness includes a plurality of conduction paths and the plurality of conduction paths are aligned, for a part which otherwise has rigidity and becomes difficult to be bent, since the conduction paths which are provided with the tolerance absorbing parts are included, the position of the mounting part at the one end side can be displaced in the X, Y and Z directions, for example, in a state where the mounting part at the other end side of the wire harness is fixed. Further, since the tolerance absorbing parts are arranged substantially in the same position, even if the plurality of conduction paths are aligned, a displacement becomes easy. With the function of the tolerance absorbing parts, the displaced state of the wire harness after a displacement can be held. Therefore, an effect is achieved that even if the wire harness includes the plurality of conduction paths, while a position shift or dimensional tolerance related to mounting or the like can be sufficiently absorbed, the state of absorbing the position shift or dimensional tolerance can be maintained.

DESCRIPTION OF EMBODIMENTS

In the wire harnesses according to the embodiments of the invention, conduction paths are provided with a tolerance absorbing part which can absorb a position shift or a dimensional tolerance related to mounting or the like sufficiently.

Embodiment 1

Next, an embodiment 1 of the invention is described with reference to the figures. A wire harness of the embodiment 1 may be wired in a hybrid vehicle or an electric vehicle. Below, an example in a hybrid vehicle is given and described. Even in the case of an electric vehicle, the construction, structure, and effects of the wire harness of the present invention are basically the same. Further, the present invention is applicable to not only the hybrid vehicle or the electric vehicle, but also ordinary vehicles or the like.

Figure 1:
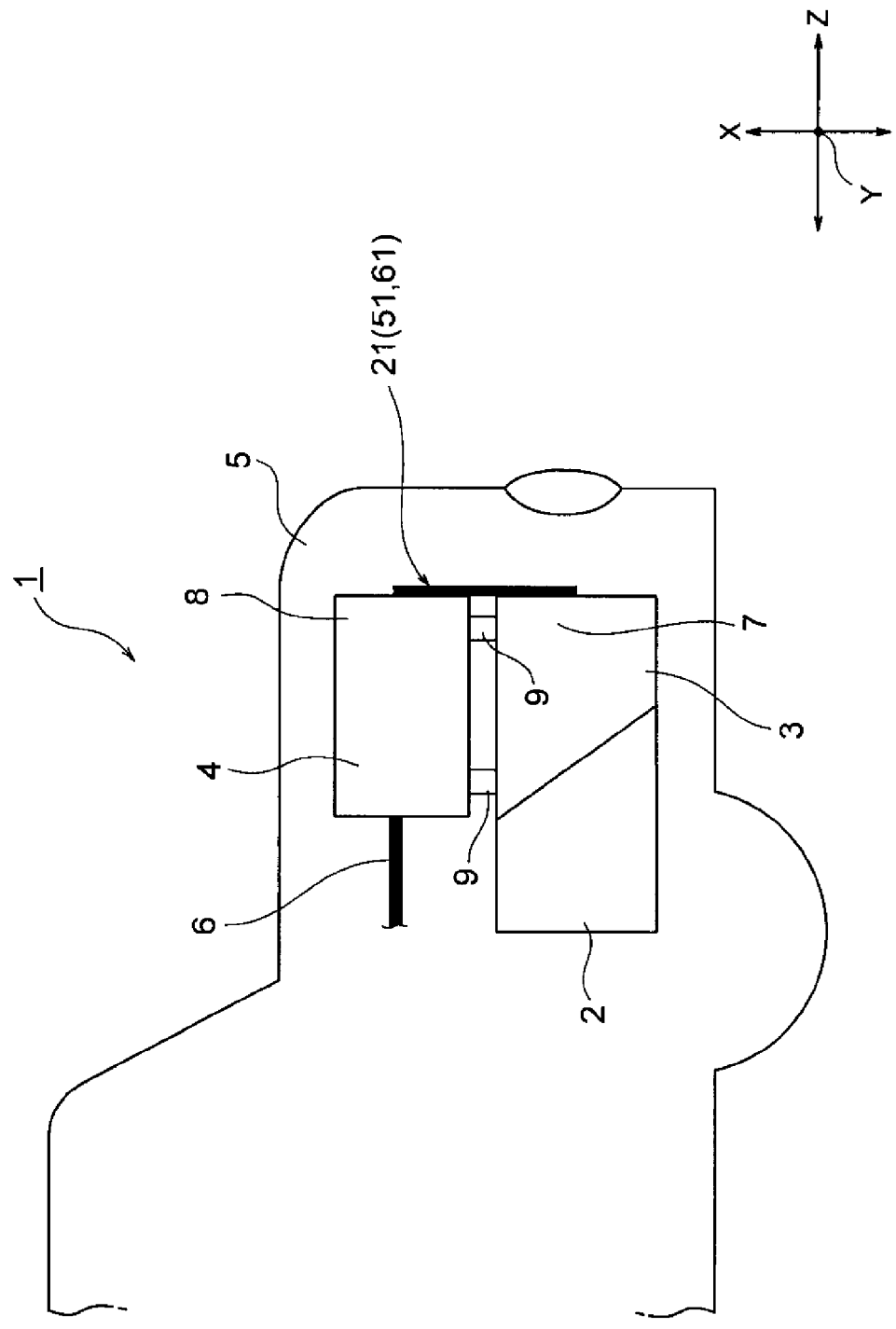
FIG. 1 is a schematic view which shows a wiring example of wire harnesses according to an embodiment of the present invention.
Figure 2:
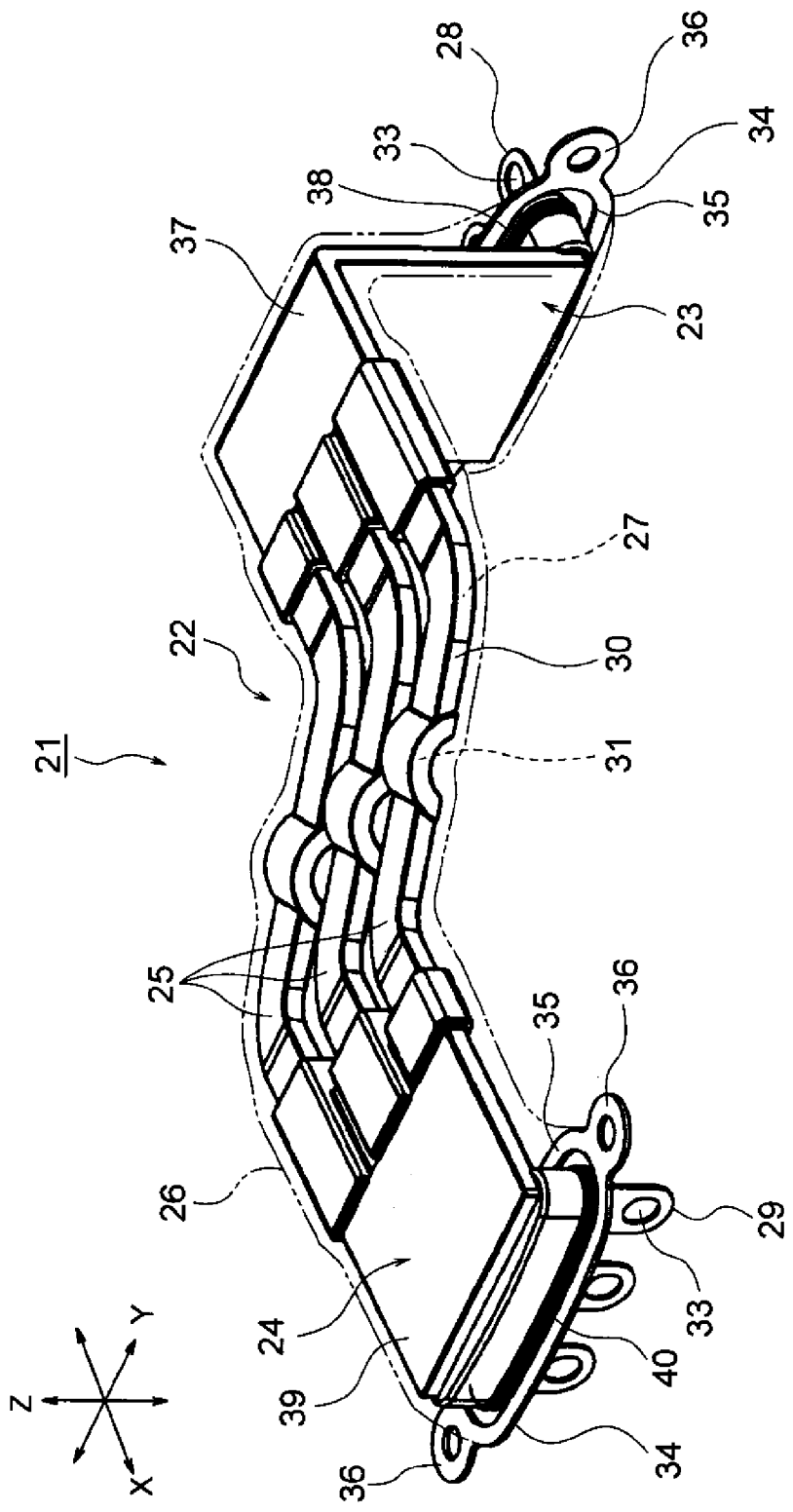
FIG. 2 is a perspective view of a wire harness according to one embodiment of the present invention (embodiment 1).
Figure 3:
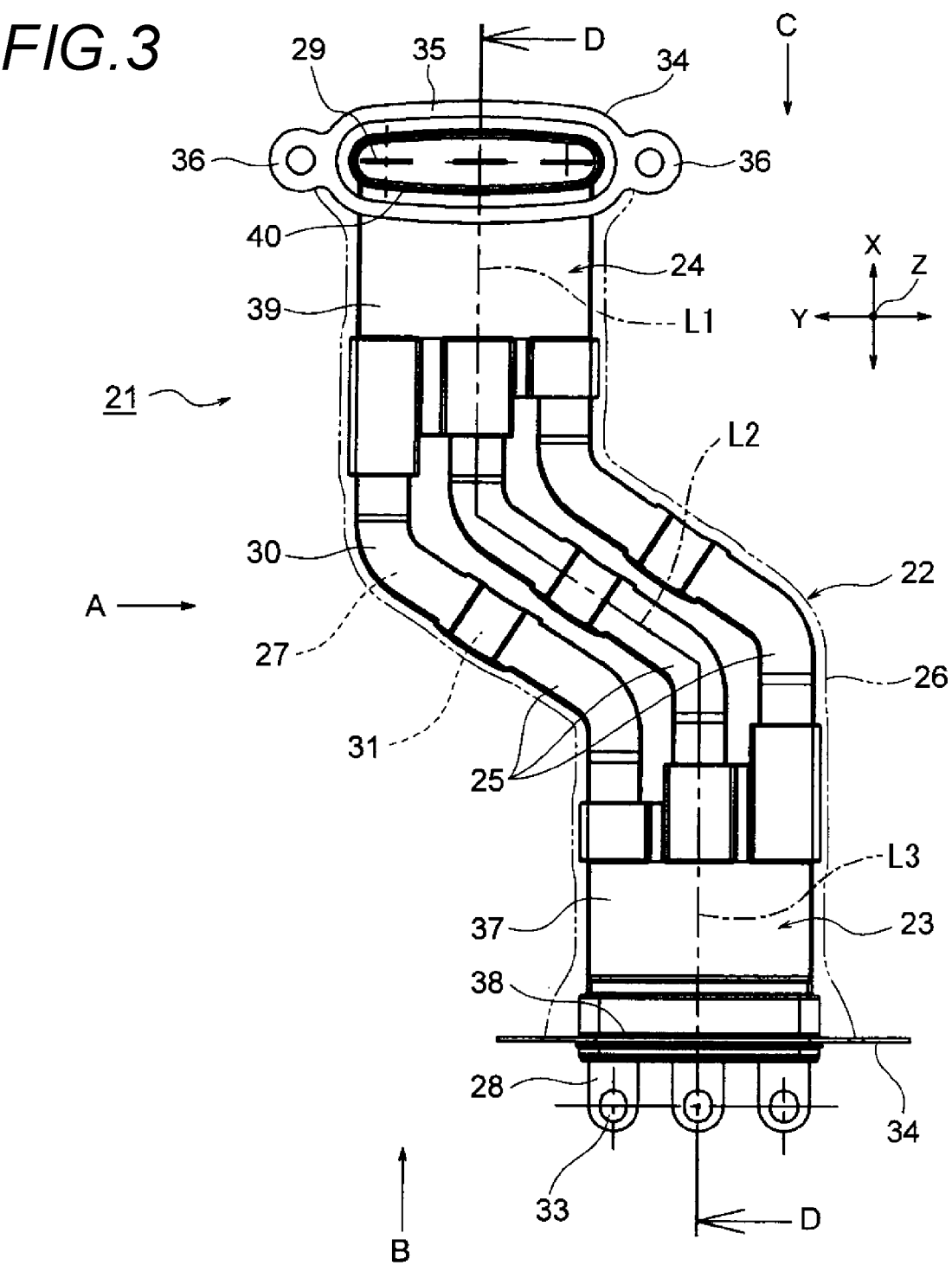
FIG. 3 is a bottom view of the wire harness shown in FIG. 2.
Figure 4:
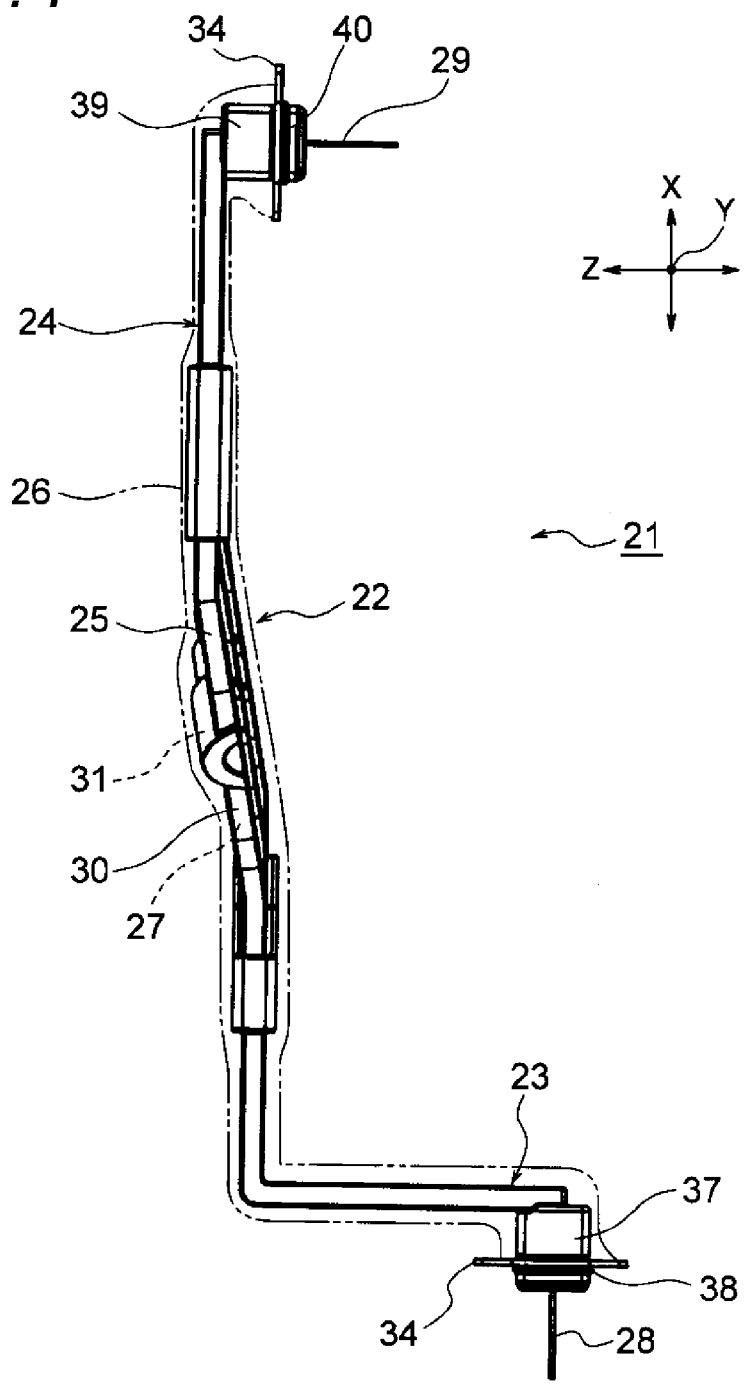
FIG. 4 is a diagram of the wire harness of FIG. 3 when viewed from the direction of an arrow A.
Figure 5:
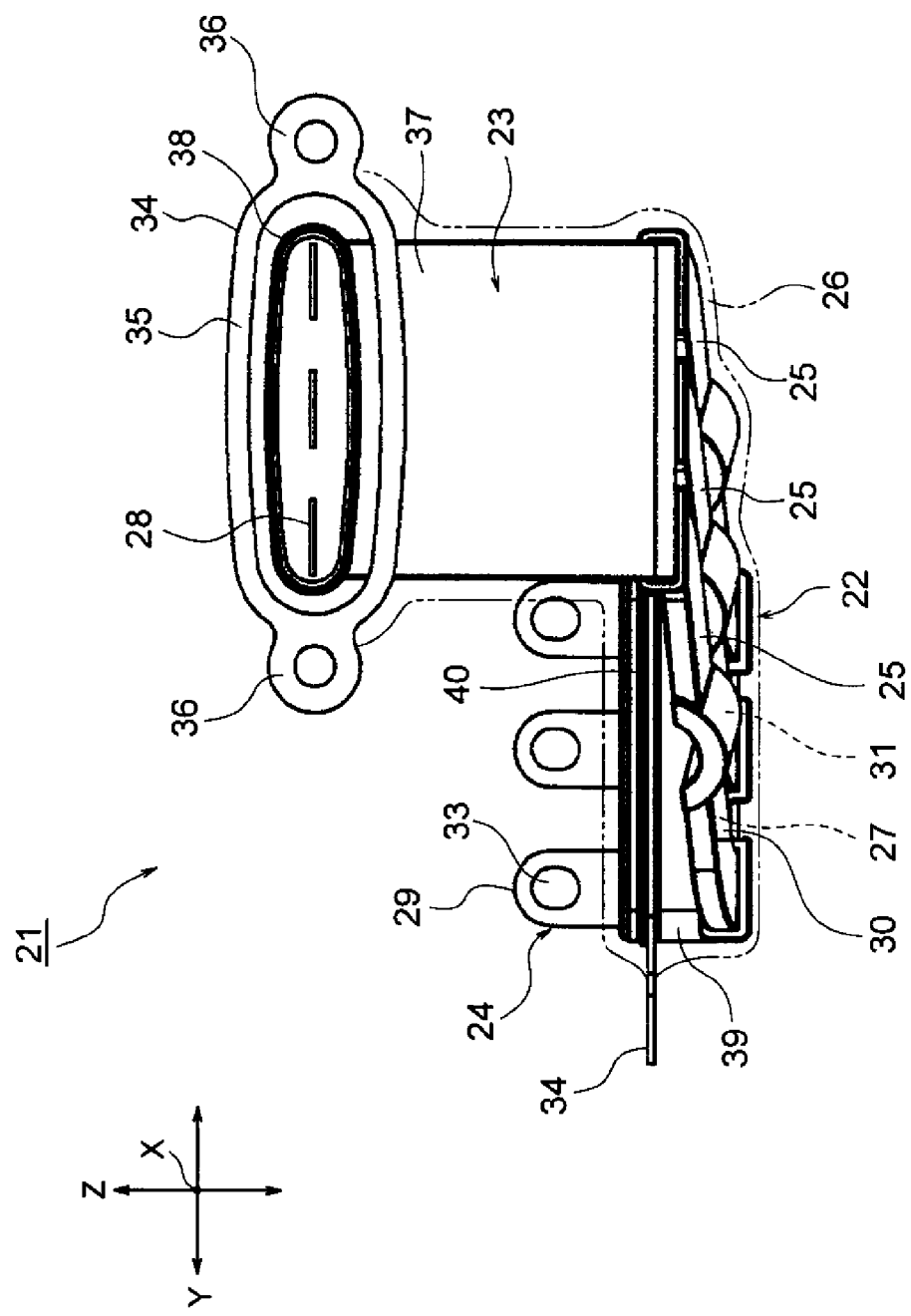
FIG. 5 is a diagram of the wire harness of FIG. 3 when viewed from the direction of an arrow B.
Figure 6:
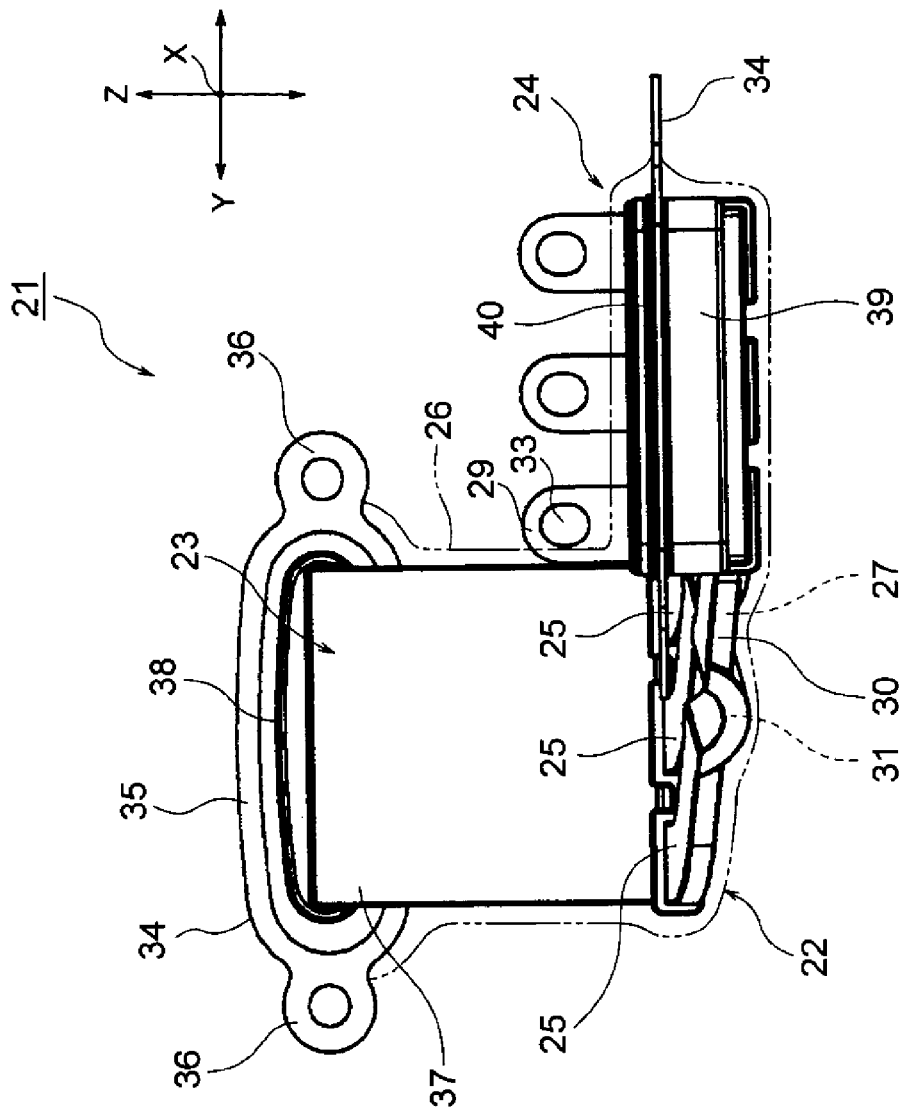
FIG. 6 is a diagram of the wire harness of FIG. 3 when viewed from the direction of an arrow C.

In FIG. 1, a reference number 1 indicates a hybrid vehicle. The hybrid vehicle 1 is a vehicle which is driven by mixing two powers of an engine 2 and a motor unit 3, and electric power from a battery (battery pack) not shown in the figure will be supplied to the motor unit 3 via an inverter unit 4. The engine 2, the motor unit 3 and the inverter unit 4 are mounted (carried) in an engine room 5 at the position of front wheels or the like in the embodiment. The battery which is not shown in the figure is mounted (carried) in a vehicle indoor space which exists behind the engine room 5, or at a vehicle rear part having rear wheels.

The motor unit 3 and the inverter unit 4 are connected with a high voltage wire harness 21 of the present embodiment 1. The battery not shown in the figure and the inverter unit 4 are connected with a high voltage wire harness 6. The wire harness 6 is wired from the engine room 5 to, for example, the under floor which becomes the ground surface side of a floor panel.

Supplementary explanation is made in the embodiment here, and the motor unit 3 includes a motor and a generator in construction. The inverter unit 4 includes an inverter and a converter in construction. The motor unit 3 is formed as a motor assembly including a shield casing 7. The inverter unit 4 also is formed as an inverter assembly including a shield casing 8. The battery not shown in the figure is a Ni-MH battery or Li-ion battery, and is modularized. An electricity accumulating device such as a capacitor may be used. The battery not shown in the figure shall not be particularly limited as long as the battery may be used for the hybrid vehicle 1 or an electric vehicle.

In the embodiment, the inverter unit 4 is arranged and fixed right above the motor unit 3. That is, the inverter unit 4 and the motor unit 3 are closely mounted. Because of such a mounting condition, the wire harness 21 is short. Regarding the inverter unit 4 and the motor unit 3, reference numbers 9 indicate fixing legs for arranging and fixing the inverter unit 4 above the motor unit 3.

First, the construction and structure of the wire harness 21 of the present embodiment 1 are described in detail.

In FIGS. 2 to 7, the wire harness 21 includes a harness body 22, a motor side connector 23 (mounting part) provided at one end of the harness body 22, and an inverter side connector 24 (mounting part) provided at the other end of the harness body 22. The motor side connector 23 and the inverter side connector 24 include a part of the harness body 22.

As can be known from the following description, the wire harness 21 has such construction and structure that a position shift and a dimensional tolerance can be absorbed sufficiently. Even if the wire harness 21 becomes thick or short due to high voltage, on the whole, the wire harness 21 does not become a rigid body, but desired displacement or shape-keeping is possible and a position shift and a dimensional tolerance can be sufficiently absorbed.

Arrows X in the figures show an up-down direction of the vehicle. Arrows Y show a right-left direction of the vehicle (vehicle width direction). Arrows Z show a front-back direction of the vehicle. In the embodiment, the central axis L1 of the motor side connector 23 and the central axis L3 of the inverter side connector 24 are not on the same straight line, and when viewed as a whole including the central axis L2 in the middle of the harness body 22, a central axis will become an approximately crank form (refer to FIG. 3). The invention is not limited in this respect. For example, the central axes L1 to L3, when viewed, may be on the same straight line.

Figure 7:
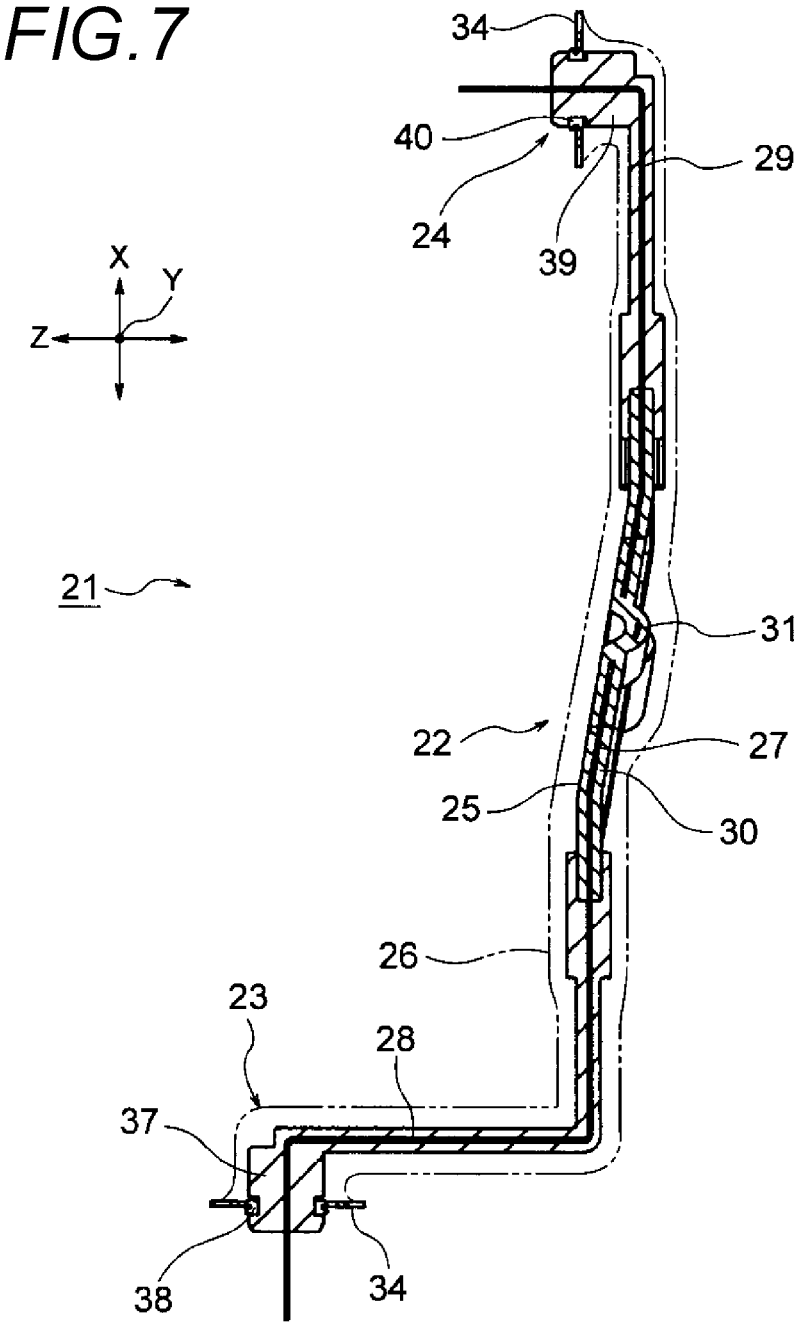
FIG. 7 is a D-D line cross sectional view of the wire harness of FIG. 3.
Figure 8:
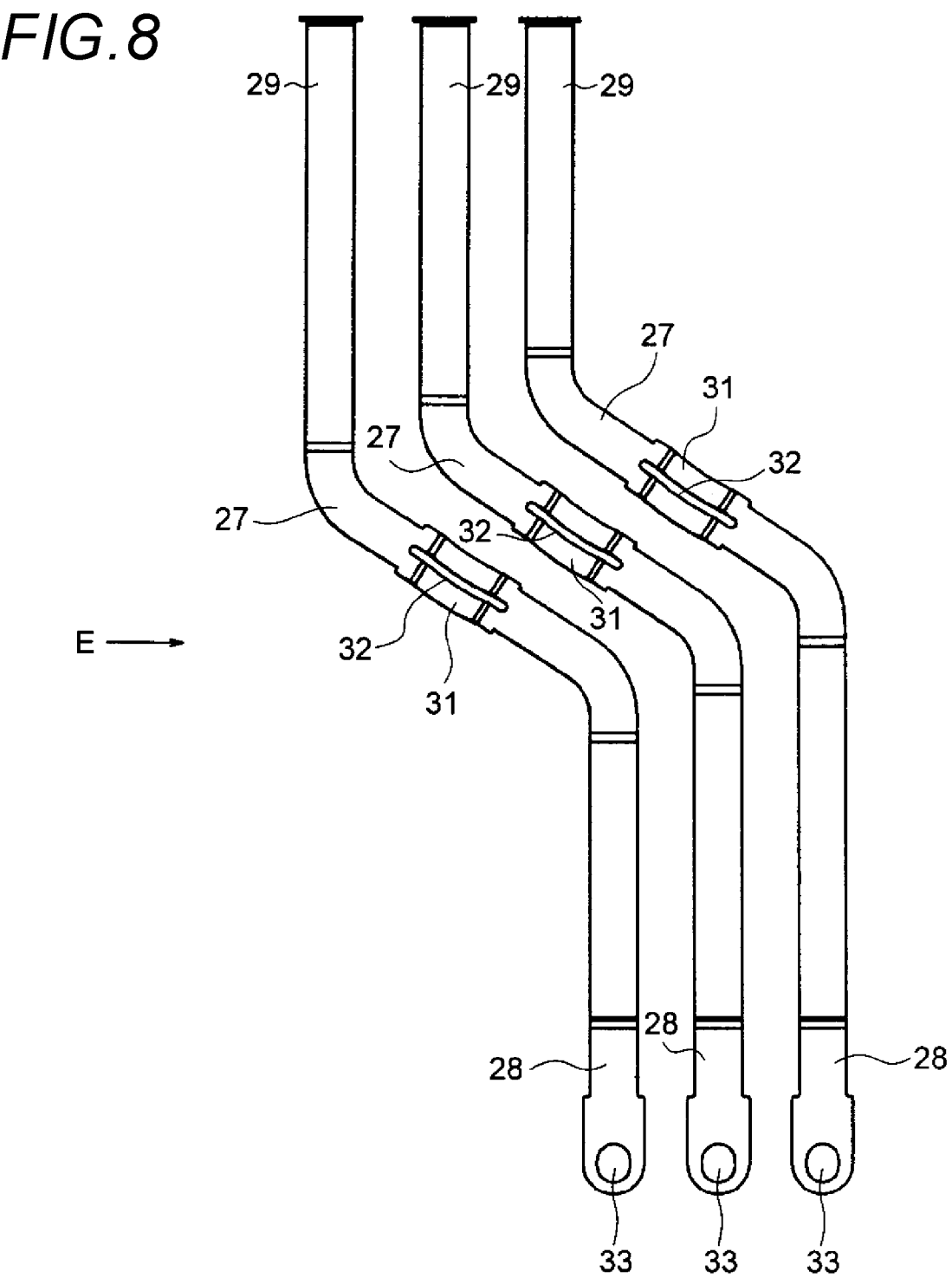
FIG. 8 is a bottom view of conductor bodies which form high voltage conduction paths shown in FIG. 3.
Figure 9:
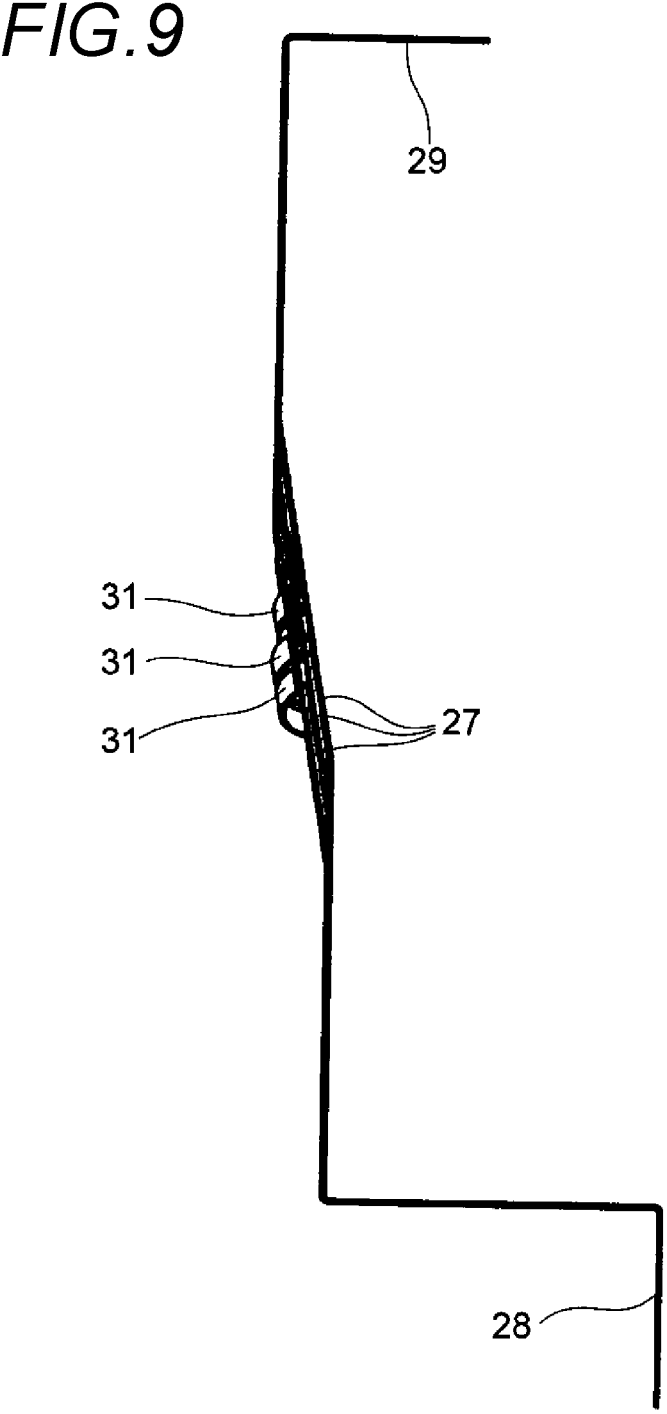
FIG. 9 is a diagram of the conductor bodies of FIG. 8 when viewed from the direction of an arrow E.

In FIGS. 7 to 9, the harness body 22 includes a plurality of (here, three) high voltage conduction paths 25 (conduction path) which are separated at a predetermined interval substantially on the same plane and are located in parallel, and an electromagnetic shielding member 26 which collectively covers the plurality of high voltage conduction paths 25.

The high voltage conduction path 25 includes a conductor body 27 and connecting parts 28 and 29 which are provided to follow one end and the other end of the conductor body 27. The high voltage conduction path 25 further includes a mold part 30 which is provided outside the conductor body 27.

The connecting part 28 which follows one end of the conductor body 27 is provided as a portion which forms a part of the motor side connector 23. Likewise, the connecting part 29 which follows the other end of the conductor body 27 is provided as a portion which forms a part of the inverter side connector 24.

The conductor body 27 and the connecting parts 28 and 29 are formed by forging a metal plate that has conductivity. In the embodiment 1, the conductor body 27 and the connecting parts 28 and 29 are formed into a bus bar shape (strip shape) which has a predetermined conductor width and a predetermined thickness. The conductor body 27 and the connecting parts 28 and 29 are not limited to the bus bar shape. Examples other than the bus bar shape will be described later. The bus-bar-shaped conductor body 27 and the connecting parts 28 and 29 are so formed that the whole of the conductor body 27 and the connecting parts 28 and 29 does not become a rigid body and desired displacement and shape-keeping are enabled by a tolerance absorbing part 31 to be described later. Because the conductor body 27 and the connecting parts 28 and 29 have a bus bar shape obtained by forging the metal plate, the conductor body 27 and the connecting parts 28 and 29 become solid.

Since the above-mentioned central axes L1 to L3 (refer to FIG. 3) become an approximately crank form, the conductor body 27 is formed in accordance with the central axes L1 to L3. The tolerance absorbing part 31 is provided at a portion corresponding to the above-mentioned central axis L2 of the conductor body 27. The tolerance absorbing part 31 is formed to allow desired displacement and shape-keeping. The tolerance absorbing part 31 is formed to have a mountain-like shape (valley-like shape) in the embodiment 1. However, this shape is an example. Other shapes will be described after the embodiment 2. In more detail, a hump-backed bridge shape or a semicircular shape is formed. The tolerance absorbing part 31 is formed as a portion where the rigidity of the conductor body 27 is reduced, namely, as a portion which facilitates bending or stretching (a portion which is easy to be displaced, or a portion which is easy to be moved).

In addition, the tolerance absorbing part 31 is formed to allow the displacement state to be maintained after bending or stretching. That is, the tolerance absorbing part 31 is formed so as not to return the state to a state before the bending or stretching. Of course, a slight return is not considered as a problem. It is not a problem unless the return has an influence on operability or connection reliability.

A slit 32 is formed in the tolerance absorbing part 31. The slit 32 is formed at the center of the tolerance absorbing part 31 in the conductor width direction. The slit 32 is formed to extend in a direction which is generally perpendicular to the conductor width direction. The slit 32 is formed as a portion which further reduces the rigidity in the tolerance absorbing part 31. The tolerance absorbing part 31 is formed into a shape which bulges slightly outwards in the conductor width direction in order to make the cross sectional area not to be reduced with the formation of the slit 32.

Although the number of the tolerance absorbing part 31 that is provided in the conductor body 27 in the embodiment 1 is one, the present invention shall not be limited in this respect. Although the tolerance absorbing part 31 is provided substantially at the center of the conductor body 27, the present invention shall not be limited in this respect. That is, the number of tolerance absorbing parts or the places where the tolerance absorbing parts are provided may be set as required for desired displacement or the like. For example, two tolerance absorbing parts may be provided at portions corresponding to the above-mentioned central axis L2 of the conductor body 27, or an intersection of the above-mentioned central axes L1 and L2 and an intersection of the above-mentioned central axes L3 and L2, respectively.

The connecting parts 28 and 29 are formed in accordance with the form of the connecting parts which are not shown in the figure in the motor unit 3 and the inverter unit 4 (refer to FIG. 1). Further, the connecting parts 28 and 29 are formed in accordance with the forms of the motor side connector 23 and the inverter side connector 24. In the embodiment 1, the connecting parts 28 and 29 are formed so that the connecting part 28 and the connecting part (which is not shown) of the motor unit 3 can be overlapped and fastened with a bolt and a nut, and the connecting part 29 and the connecting part (which is not shown) of the inverter unit 4 can be overlapped and fastened with a bolt and a nut. Through holes 33 are formed at the distal ends of the connecting parts 28 and 29, respectively.

The mold part 30 is provided as a coating which has insulation and flexibility. The mold part 30 is provided as a portion which can protect the conductor body 27 in a state of being provided with the tolerance absorbing part 31 or the like, and as a portion which can waterproof. The mold part 30 is formed by molding using elastomers, such as rubber.

In FIGS. 2 to 7, the electromagnetic shielding member 26 is a member for serving as an electromagnetic shielding function, and, for example, is formed by striking a braid or a metal foil into a pipe form. The electromagnetic shielding member 26 is formed to have such a length that the motor side connector 23 and the inverter side connector 24 in the embodiment are covered.

Although the electromagnetic shielding member 26 is typically fixed usually using shielding shells, in the embodiment, the electromagnetic shielding member 26 is fixed by including clamping and fixing members 34 which have conductivity, and bolts which are not shown in the figures and can fasten the clamping and fixing members 34 to the shield casing 7 of the motor unit 3, and the shield casing 8 of the inverter unit 4 (refer to FIG. 1). The clamping and fixing member 34 has a terminal pressing part 35 which has an annular plate form, and a pair of fixing parts 36 which are coupled to the terminal pressing part 35. Bolt through holes (number omitted) for the above-mentioned bolts which are not shown are formed to penetrate the pair of fixing parts 36.

Portions that can go through the pair of fixing parts 36 are formed at the end parts of the electromagnetic shielding member 26. Then, the terminal pressing part 35 is inserted into the end parts, and after the insertion, the end parts are folded inwards and are made to pass through the inner edges of the terminal pressing part 35. Then, substantially pouchlike holding parts are formed in this way, and the clamping and fixing members 34 can be held (for more details, refer to a Japanese patent application No. 2010-132585). Thus, when the clamping and fixing members 34 are fixed with the bolts which are not shown, the end parts of the electromagnetic shielding member 26 are put between the terminal pressing parts 35 and the shield casings 7 (8), and thereby the electric connection will be completed.

The motor side connector 23 includes the connecting parts 28 in the high voltage conduction paths 25. The motor side connector 23 includes a housing 37 which is provided by resin molding the connecting parts 28. The distal end of the motor side connector 23 is inserted in the shield casing 7 of the motor unit 3 (refer to FIG. 1), and electric connection will be accomplished inside. A rubber packing 38 is provided at the outer edge of the distal end of the housing 37.

The inverter side connector 24 includes the connecting parts 29 in the high voltage conduction paths 25 like the motor side connector 23. The inverter side connector 24 includes a housing 39 which is provided by resin molding the connecting parts 29. The distal end of the inverter side connector 24 is inserted in the shield casing 8 of the inverter unit 4 (refer to FIG. 1), and electric connection will be accomplished inside. A rubber packing 40 is provided at the outer edge of the distal end of the housing 39.

Next, based on the above-mentioned construction and structure, the wiring of the wire harness 21 is described. The description is made with reference to FIGS. 1 to 7.

In the wiring of the wire harness 21, first, an operation of connecting and fixing the motor side connector 23 to the motor unit 3 and connecting and fixing the end part (end part at one end) of the electromagnetic shielding member 26 to the shield casing 7 via the clamping and fixing member 34 and the bolts which are not shown in the figure is performed. When the connection and fixation of the operation are completed, one end of the wire harness 21 will be in a fixed state.

When the one end of the wire harness 21 is in a fixed state, next, an operation of connecting and fixing the inverter side connector 24 to the inverter unit 4 will be performed. Further, an operation of connecting and fixing the end part (end part at the other end) of the electromagnetic shielding member 26 to the shield casing 8 via the clamping and fixing member 34 and the bolts which are not shown in the figure is performed. At the time, for example, when a position shift occurs at the inverter unit 4 or when a dimensional tolerance is comparatively large, the position shift or the dimensional tolerance is absorbed by displacing the inverter side connector 24, and then the connection and fixation is completed.

Since the wire harness 21 has the tolerance absorbing parts 31, the above displacement by bending or stretching in the arrows X, Y and Z directions with the tolerance absorbing parts 31 becomes possible, and thereby the position shift or the dimensional tolerance can be absorbed. Since the tolerance absorbing part 31 has the slit 32, the slit 32 makes the rigidity to be reduced, and a displacement becomes easy. Because the displaced state of the wire harness 21 due to the bending or stretching in the arrows X, Y and Z directions is kept since the tolerance absorbing parts 31 deform plastically, it can be prevented to apply an unnecessary stress or the like to the connecting and fixing portions.

Embodiment 2

Figure 10:
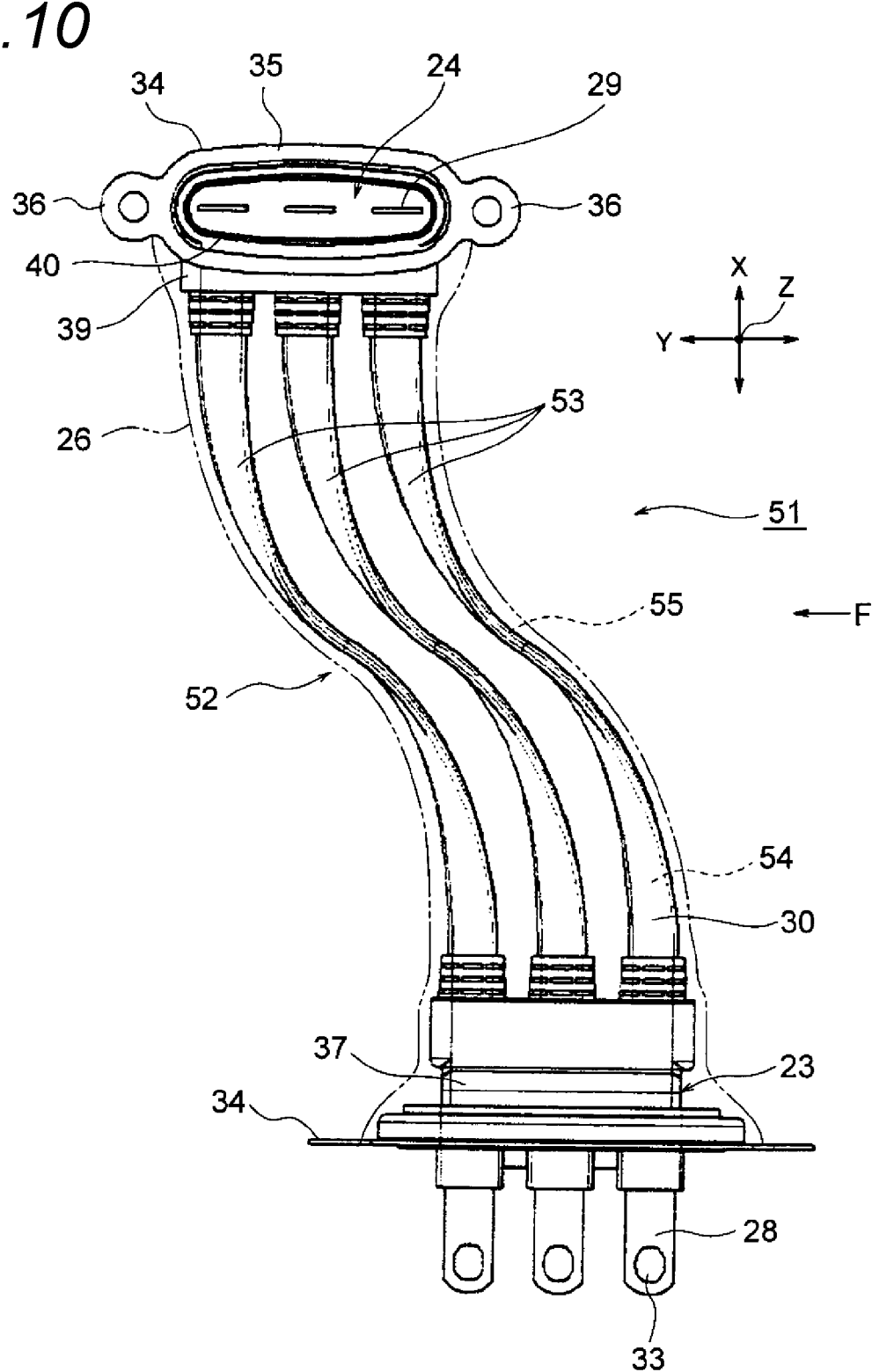
FIG. 10 is a bottom view of a wire harness according to another embodiment of the invention (embodiment 2).
Figure 11:
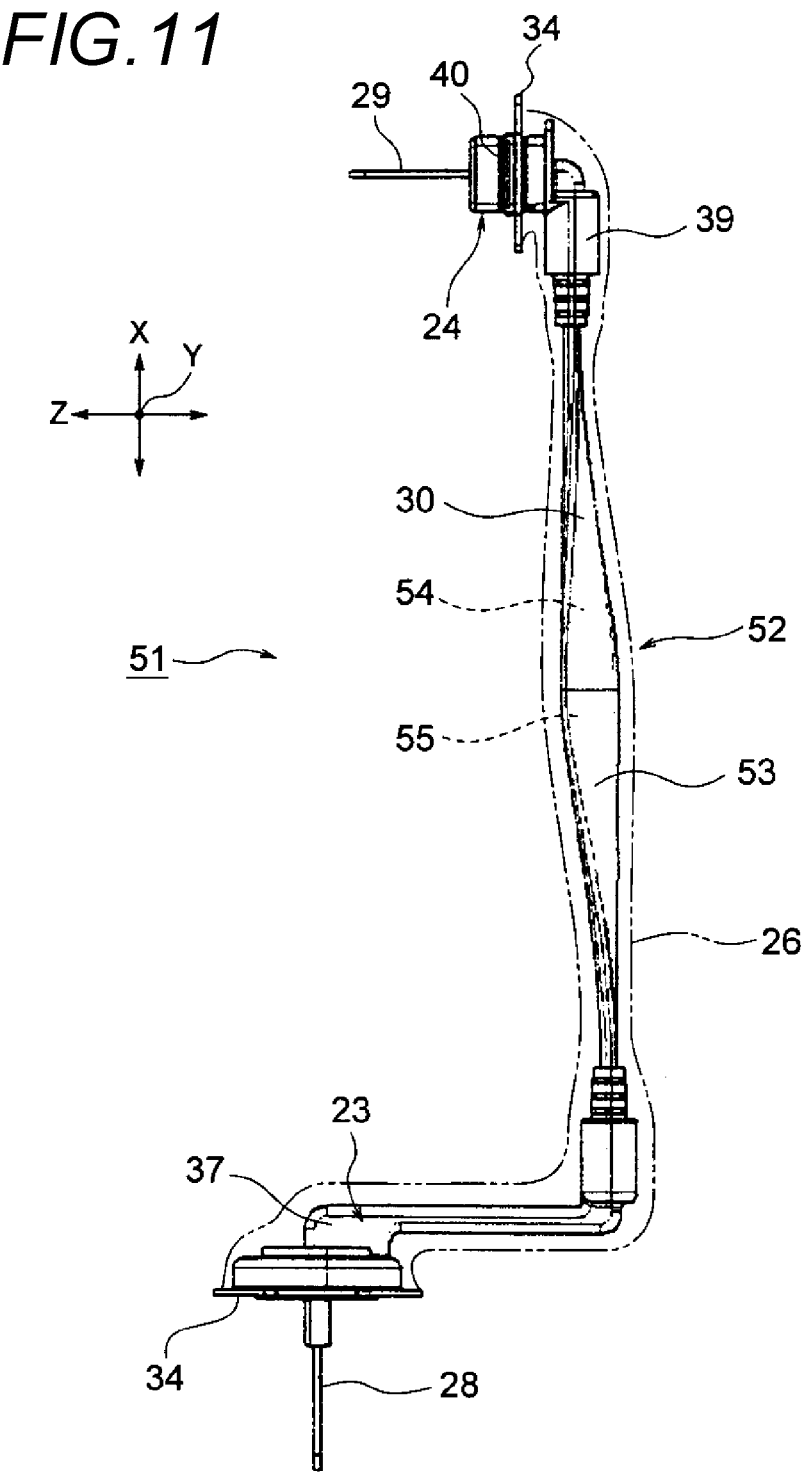
FIG. 11 is a diagram of the wire harness of FIG. 10 when viewed from the direction of an arrow F.
Figure 12:
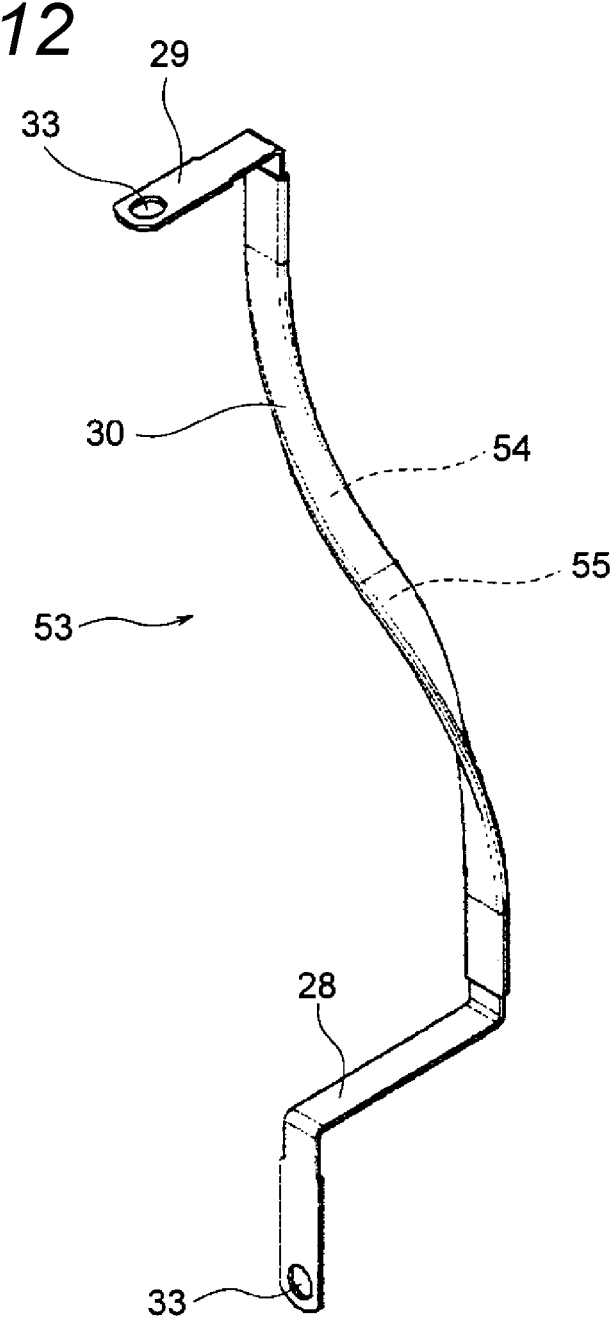
FIG. 12 is a perspective view of a high voltage conduction path shown in FIG. 10.
Figure 13:
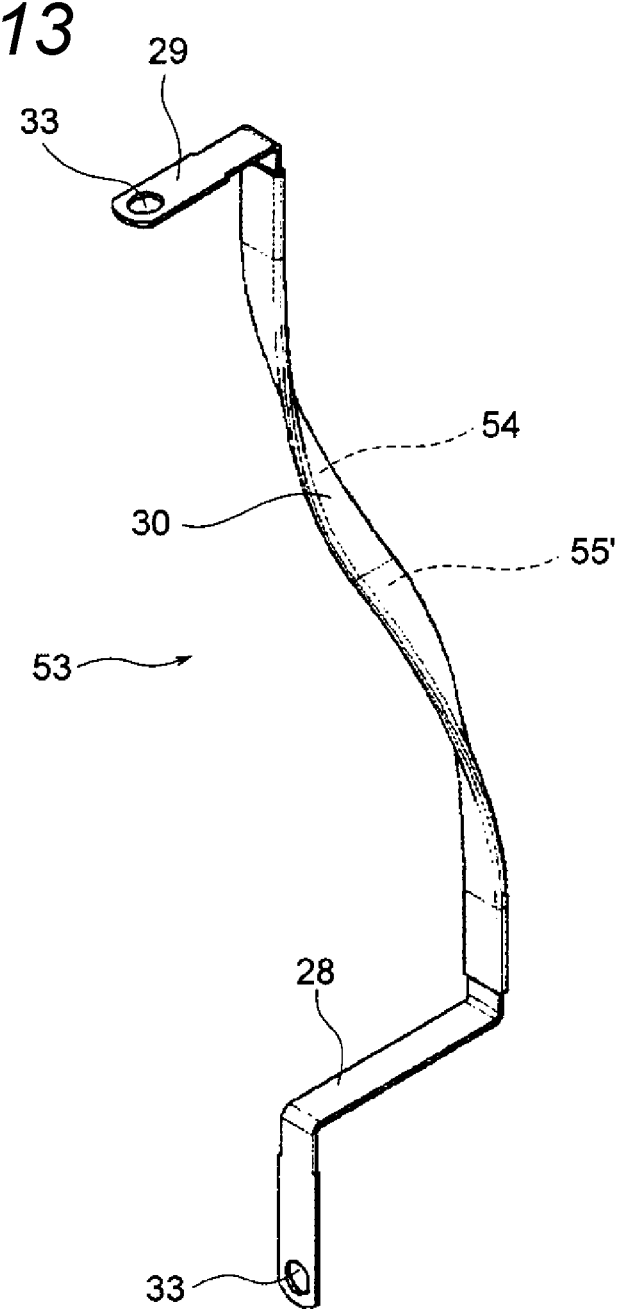
FIG. 13 is a perspective view of a high voltage conduction path which is a variation of that shown in FIG. 12.
Figure 14:
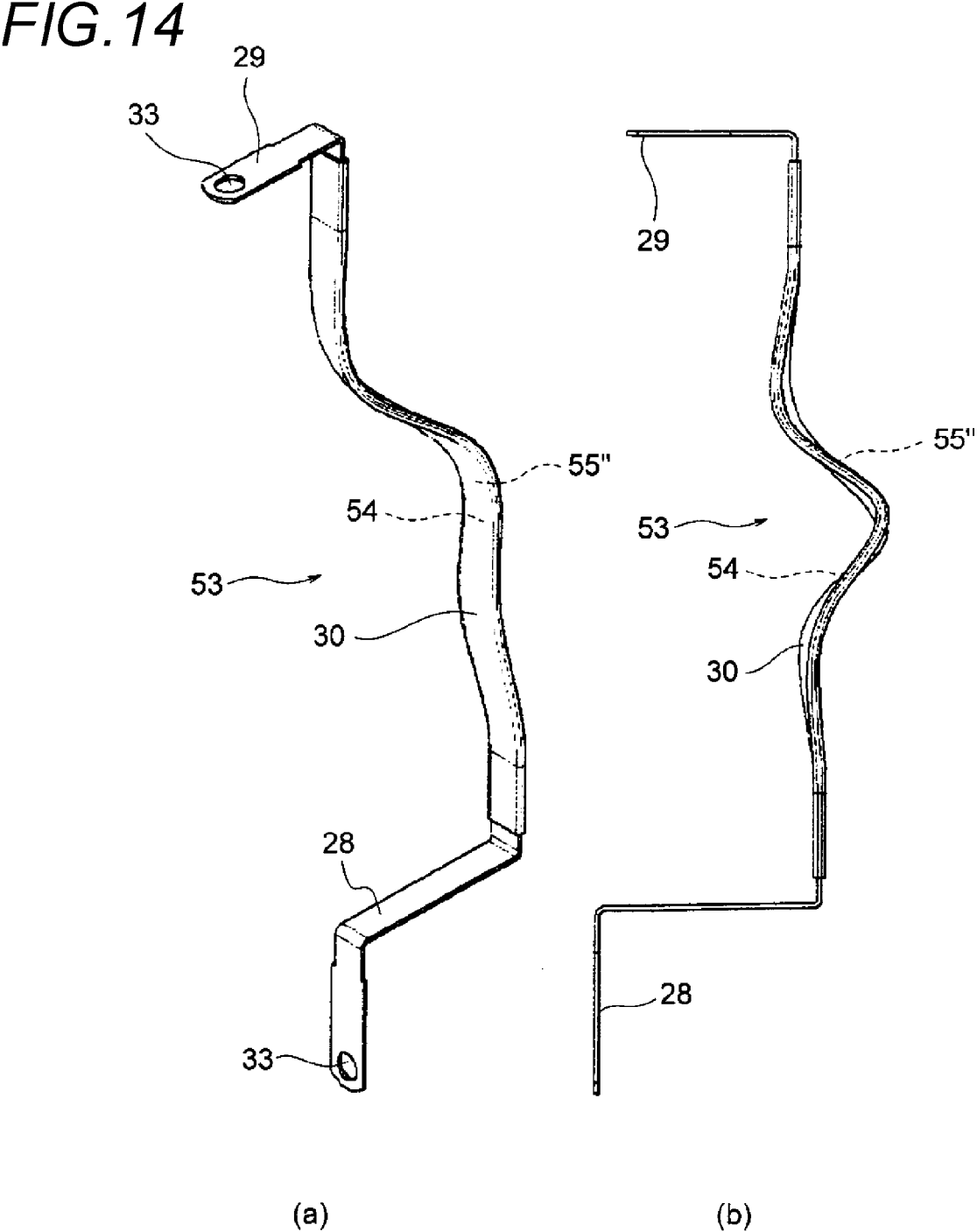
FIG. 14(a) is a perspective view of a high voltage conduction path which is a variation of that shown in FIG. 12.
FIG. 14(b) is a side view of FIG. 14(a).

Next, an embodiment 2 is described with reference to the figures. FIG. 10 is a bottom view of a wire harness according to another embodiment of the invention. FIG. 11 is a diagram of the wire harness of FIG. 10 when viewed from the direction of an arrow F. FIG. 12 is a perspective view of a high voltage conduction path shown in FIG. 10. FIGS. 13, 14(*a*) and 14(*b*) are drawings of high voltage conduction paths which are variations of the high voltage conduction path in FIG. 12. Furthermore, the components that are identical with those in the above-mentioned embodiment 1 are given identical numbers, and their detailed description is omitted.

In FIGS. 10 and 11, a wire harness 51 includes a harness body 52, a motor side connector 23 (mounting part) provided at one end of the harness body 52, and an inverter side connector 24 (mounting part) provided at the other end of the harness body 22. The motor side connector 23 and the inverter side connector 24 include a part of the harness body 52. The wire harness 51 differs from that in the embodiment 1 in high voltage conduction paths 53 (conduction paths) to be described later which forms the harness body 52, and basically has the same effects as those of the embodiment 1. Next, the harness body 52 is described.

The harness body 52 includes a plurality of (here, three) high voltage conduction paths 53 (conduction path) which are separated at a predetermined interval substantially on the same plane and are located in parallel, and an electromagnetic shielding member 26 which collectively covers the plurality of high voltage conduction paths 53.

In FIG. 12, the high voltage conduction path 53 includes a conductor body 54 and connecting parts 28 and 29 which are provided to follow one end and the other end of the conductor body 54. The high voltage conduction path 53 further includes a mold part 30 which is provided outside the conductor body 54.

The conductor body 54 and the connecting parts 28 and 29 are formed by forging a metal plate that has conductivity. In the embodiment 2, the conductor body 54 and the connecting parts 28 and 29 are formed into a bus bar shape (strip shape) which has a predetermined conductor width and a predetermined thickness. Further, the conductor body 54 and the connecting parts 28 and 29 are formed into a shape by additionally twisting the bus bar shape. The bus-bar-shaped conductor body 54 and the connecting parts 28 and 29 are so formed that the whole of the conductor body 27 and the connecting parts 28 and 29 does not become a rigid body and desired displacement and shape-keeping are enabled by a tolerance absorbing part 55 to be described later. Because the conductor body 54 and the connecting parts 28 and 29 have a bus bar shape obtained by forging the metal plate, the conductor body 27 and the connecting parts 28 and 29 become solid.

The conductor body 54 is formed to have an approximately crank form in the embodiment 2. The central portion of the conductor body 54 is formed into the tolerance absorbing part 55. The tolerance absorbing part 55 is formed to allow desired displacement and shape-keeping. The tolerance absorbing part 55 is formed into a twisted shape as mentioned above in the embodiment 2. The twisted shape shall be an example. In more detail, the twisted shape is formed by rotating about 180 degrees.

Further, the twisting is not limited to the rotating about 180 degrees described above, but it is also possible to form, for example, a tolerance absorbing part 55' by combining a 90-degree twist and a 90-degree reverse twist as shown in FIG. 13, or a tolerance absorbing part 55" formed into an approximately wavy form by being additionally twisted as shown in FIG. 14.

In other words, the tolerance absorbing part 55 (55', 55") is formed as a portion where the rigidity of the conductor body 54 is reduced, namely, as a portion which facilitates bending or stretching (a portion which is easy to be displaced, or a portion which is easy to be moved).

In addition, the tolerance absorbing part 55 is formed to maintain the displacement state after bending or stretching. That is, the tolerance absorbing part 55 is formed by being deformed plastically so as not to return the state to a state before the bending or stretching. Of course, a slight return is not considered as a problem. It is not a problem unless the return has an influence on operability or connection reliability. The slit 32 of the embodiment 1 (refer to FIG. 8) may be suitably provided in the tolerance absorbing part 55.

For the above-mentioned construction and structure (refer to FIGS. 1, 10 and 11), in the wiring of the wire harness 51, first, an operation of connecting and fixing the motor side connector 23 to the motor unit 3 and connecting and fixing the end part (end part at one end) of the electromagnetic shielding member 26 to the shield casing 7 via the clamping and fixing member 34 and the bolts which are not shown in the figure is performed. When the connection and fixation of the operation are completed, one end of the wire harness 51 will be in a fixed state.

When the one end of the wire harness 51 is in a fixed state, next, an operation of connecting and fixing the inverter side connector 24 to the inverter unit 4 will be performed. Further, an operation of connecting and fixing the end part (end part at the other end) of the electromagnetic shielding member 26 to the shield casing 8 via the clamping and fixing member 34 and the bolts which are not shown in the figure is performed. At the time, for example, when a position shift occurs at the inverter unit 4 or when a dimensional tolerance is comparatively large, the position shift or the dimensional tolerance is absorbed by displacing the inverter side connector 24, and then the connection and fixation is completed.

Since the wire harness 51 has the tolerance absorbing parts 55 (55', 55''), the above displacement by bending or stretching in the arrows X, Y and Z directions with the tolerance absorbing parts 55 becomes possible. Thereby, the position shift or the dimensional tolerance can be absorbed.

Embodiment 3

Figure 15:
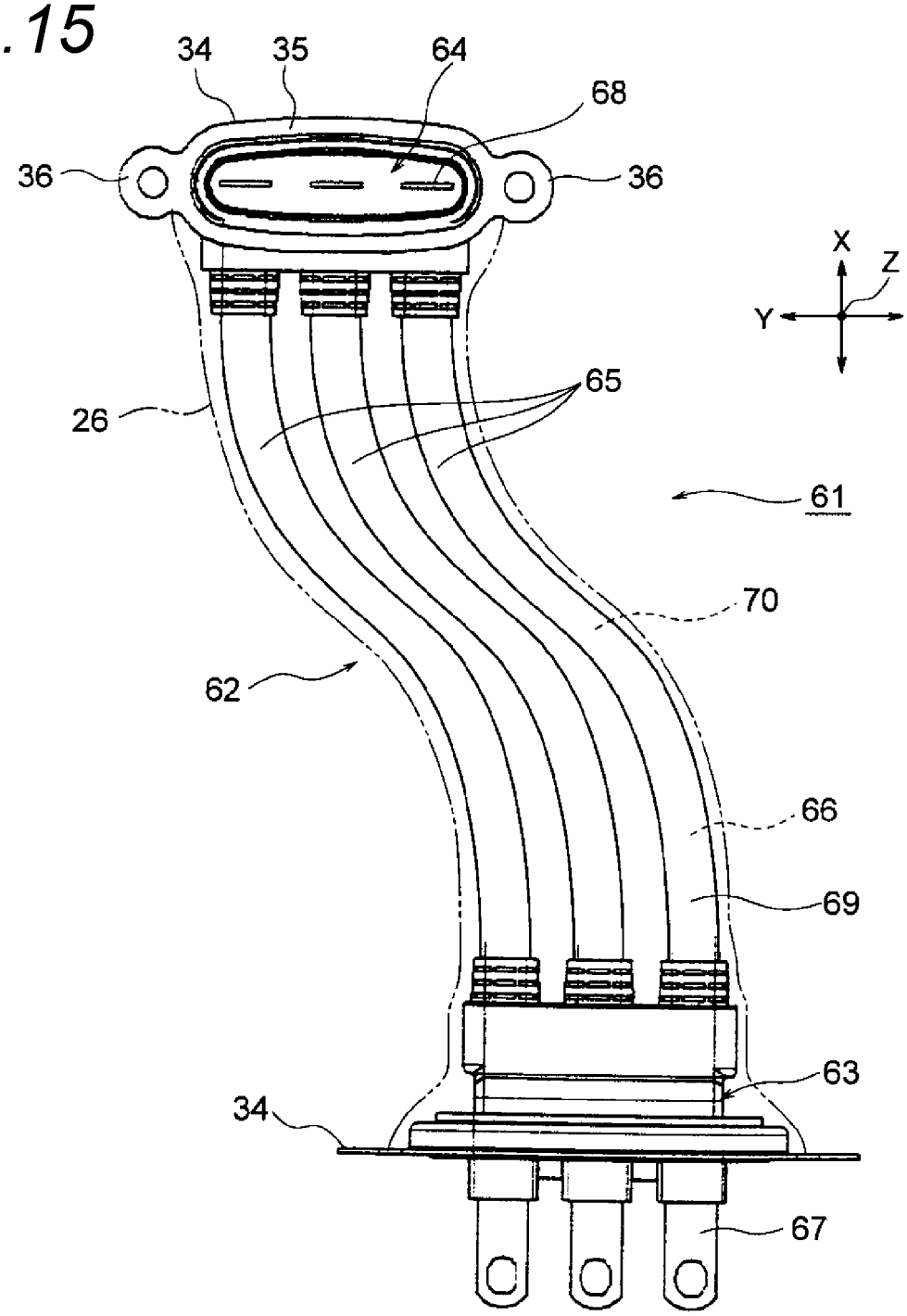
FIG. 15 is a bottom view of a wire harness according to another embodiment of the invention (embodiment 3).

Next, an embodiment 3 is described with reference to the figures. FIG. 15 is a bottom view of a wire harness according to another embodiment of the invention.

In FIG. 15, a wire harness 61 includes a harness body 62, a motor side connector 63 (mounting part) provided at one end of the harness body 62, and an inverter side connector 64 (mounting part) provided at the other end of the harness body 62. The motor side connector 63 and the inverter side connector 64 include a part of the harness body 62. Next, the above-mentioned components are described.

The harness body 62 includes a plurality of (here, three) high voltage conduction paths 65 (conduction path) which are separated at a predetermined interval substantially on the same plane and are located in parallel, and an electromagnetic shielding member 26 which collectively covers the plurality of high voltage conduction paths 65. Although the harness body 62 is not particularly limited, the same electromagnetic shielding member 26 as that in the embodiments 1 to 2 shall be used for the harness body 62.

The high voltage conduction path 65 includes a conductor body 66 and connecting parts 67 and 68 which are provided to follow one end and the other end of the conductor body 66. The high voltage conduction path 65 further includes a mold part 69 which is provided outside the conductor body 66.

The conductor body 66 has conductivity, and is made of copper, copper alloy, or aluminum. The conductor body 66 may be either a conductor structure in which wires are twisted or a rod-like conductor structure whose cross section is a rectangular shape or a round shape (for example, conductor structure with a rectangular single core or a round single core). In the embodiment 3, the conductor body 66 which is made of aluminum, and has a rod-like conductor structure whose cross section is a round shape, is used. The conductor body 66 is so formed that the whole of the conductor body 66 does not become a rigid body and desired displacement and shape-keeping are enabled by a tolerance absorbing part 70 to be described later.

The connecting parts 67 and 68 are the same portions as the connecting parts 28 and 29 of the embodiments 1 to 2, and are joined by welding to the ends of the conductor body 66 in the embodiment 3. However, this shall be an example.

The conductor body 66 is formed to have an approximately crank form in the embodiment 3. The central portion (or the whole) of the conductor body 66 is formed into the tolerance absorbing part 70. The tolerance absorbing part 70 is formed to allow desired displacement and shape-keeping. The tolerance absorbing part 70 is formed as a portion which facilitates bending or stretching (a portion which is easy to be displaced, or a portion which is easy to be moved).

In addition, the tolerance absorbing part 70 is formed to maintain the displacement state after bending or stretching. That is, the tolerance absorbing part 70 is formed by being deformed plastically so as not to return the state to a state before the bending or stretching. Of course, a slight return is not considered as a problem. It is not a problem unless the return has an influence on operability or connection reliability.

The motor side connector 63 has basically the same construction and function as the motor side connectors 23 of the embodiments 1 to 2. The distal end of the motor side connector 63 is inserted in the shield casing 7 of the motor unit 3 (refer to FIG. 1), and electric connection will be accomplished inside.

The inverter side connector 64 has basically the same construction and function as the inverter side connectors 24 of the embodiments 1 to 2. The distal end of the inverter side connector 64 is inserted in the shield casing 8 of the inverter unit 4 (refer to FIG. 1), and electric connection will be accomplished inside.

For the above-mentioned construction and structure, in the wiring of the wire harness 61, first, an operation of connecting and fixing the motor side connector 63 to the motor unit 3 (refer to FIG. 1) and connecting and fixing the end part (end part at one end) of the electromagnetic shielding member 26 to the shield casing 7 (refer to FIG. 1) via the clamping and fixing member 34 and the bolts which are not shown in the figure is performed. When the connection and fixation of the operation are completed, one end of the wire harness 61 will be in a fixed state.

When the one end of the wire harness 61 is in a fixed state, next, an operation of connecting and fixing the inverter side connector 64 to the inverter unit 4 (refer to FIG. 1) will be performed. Further, an operation of connecting and fixing the end part (end part at the other end) of the electromagnetic shielding member 26 to the shield casing 8 (refer to FIG. 1) via the clamping and fixing member 34 and the bolts which are not shown in the figure is performed. At the time, for example, when a position shift occurs at the inverter unit 4 or when a dimensional tolerance is comparatively large, the position shift or the dimensional tolerance is absorbed by displacing the inverter side connector 64, and then, the connection and fixation is completed.

Since the wire harness 61 has the tolerance absorbing parts 70, the above displacement by bending or stretching in the arrows X, Y and Z directions with the tolerance absorbing parts 70 becomes possible. Thereby, the position shift or the dimensional tolerance can be absorbed.

Embodiment 4

Figure 16:
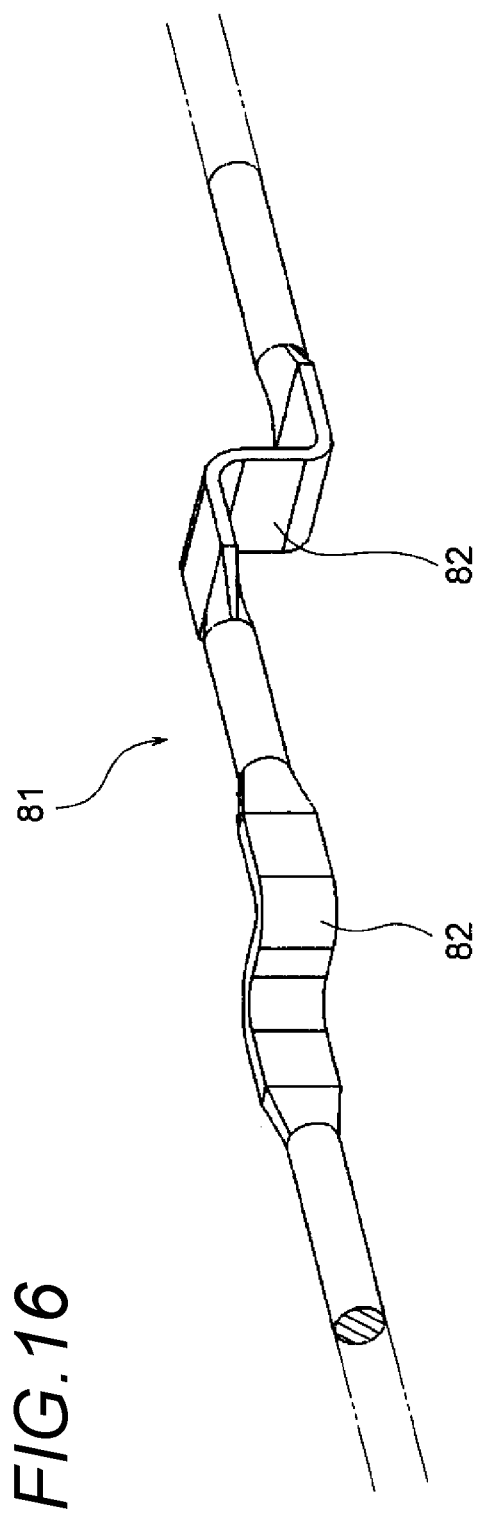
FIG. 16 is a perspective view of a conductor body which is another example.

Next, an embodiment 4 is described with reference to the figures. FIG. 16 is a perspective view of a conductor body which is another example.

In FIG. 16, a conductor body 81 has conductivity, and in the embodiment 4, the conductor body 81 which is made of aluminum, and has a rod-like conductor structure whose cross section is a round shape, is used. The conductor body 81 is so formed that the whole of the conductor body 81 does not become a rigid body and desired displacement and shape-keeping are enabled by two tolerance absorbing parts 82 to be described later. The number of the tolerance absorbing parts 82 shall be an example. One tolerance absorbing part 82 is also possible.

The two tolerance absorbing parts 82 are formed by crushing the conductor body 81, whose cross section is a round shape, into a plate-like form. The two tolerance absorbing parts 82 are formed to be arranged in a predetermined way in consideration of bending positions, bending directions and the like. The two tolerance absorbing parts 82 are formed to extend substantially in the same direction but be bent in different directions. The two tolerance absorbing parts 82 are crushed in accordance with the cross-sectional area of the round conductor body 81 (or to be slightly smaller than the cross sectional area), respectively, and thereby formed.

Even if the conductor body 81 which has the above tolerance absorbing parts 82 is adopted, it is needless to say that the wire harness plays the same effects as those in the embodiments 1 to 3.

Embodiment 5

Figure 17:
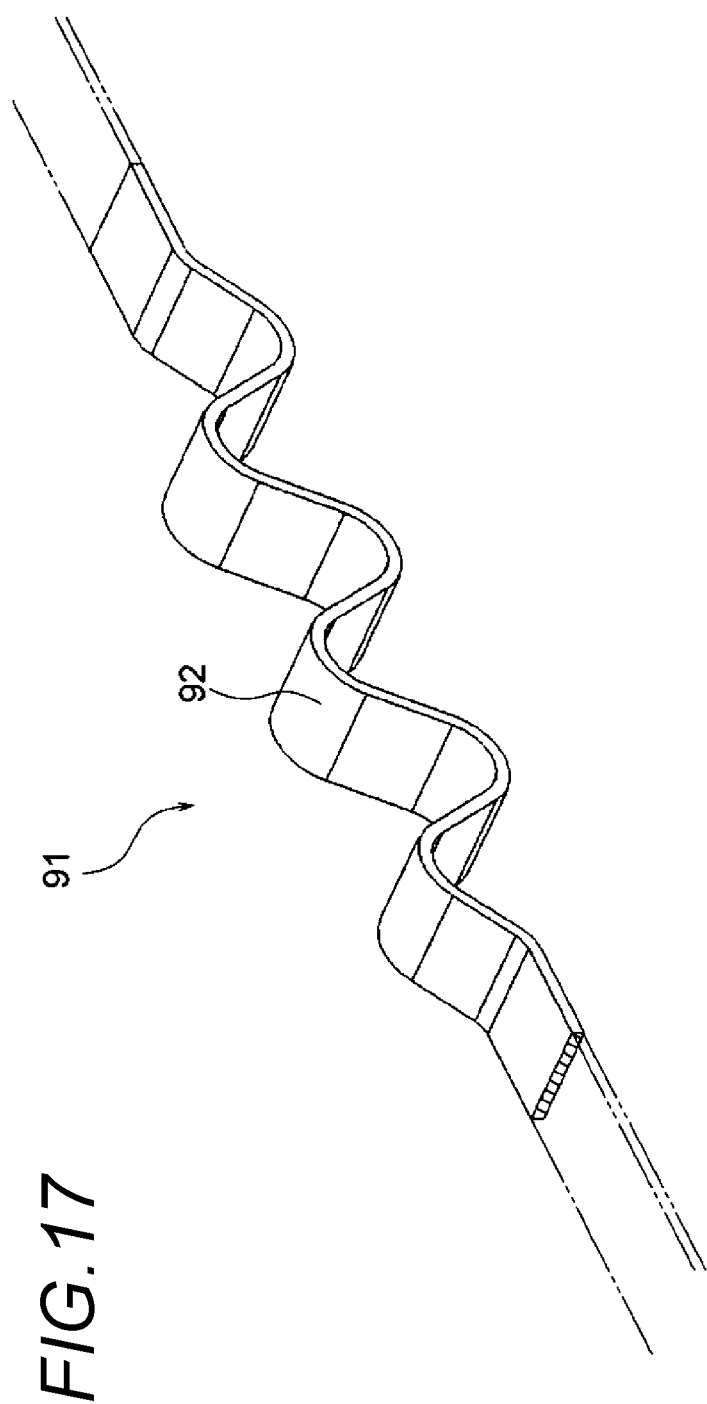
FIG. 17 is a perspective view of a conductor body which is another example.

Next, an embodiment 5 is described with reference to the figures. FIG. 17 is a perspective view of a conductor body which is another example.

In FIG. 17, a conductor body 91 has conductivity, and in the embodiment 5, the conductor body 91 which is made of aluminum, and has a bus bar shape, is used. The conductor body 91 is so formed that the whole of the conductor body 91 does not become a rigid body and desired displacement and shape-keeping are enabled by wavy tolerance absorbing parts 92 to be described later. Like the embodiment 4, a plurality of wavy tolerance absorbing parts 92 may be provided in consideration of bending positions, bending directions and the like.

Even if the conductor body 91 which has the above tolerance absorbing parts 92 is adopted, it is needless to say that the wire harness plays the same effects as those in the embodiments 1 to 3.

The wire harnesses of the present invention are described in detail with reference to the specific embodiments, but the invention is not limited to the previously described embodiments, and besides, it is apparent that various modifications can be made without changing the purpose of the invention.

This application is based on the Japanese patent application (patent application No. 2010-186804) filed on Aug. 24, 2010, the contents of which are incorporated herein by reference.

INDUSTRIAL APPLICABILITY

According to the wire harness of the present invention, the wire harness which can absorb a position shift related to mounting or the like, or a dimensional tolerance sufficiently can be provided.

REFERENCE SIGNS LIST

1: hybrid vehicle
2: engine
3: motor unit
4: inverter unit
5: engine room
6: wire harness
7, 8: shield casing
9: fixing leg
21: wire harness
22: harness body
23: motor side connector (mounting part)
24: inverter side connector (mounting part)
25: high voltage conduction path (conduction path)
26: electromagnetic shielding member
27: conductor body
28, 29: connecting part
30: mold part
31: tolerance absorbing part
32: slit
33: through hole
34: clamping and fixing member
35: terminal pressing part
36: fixing part
37, 39: housing
38, 40: rubber packing
51: wire harness
52: harness body
53: high voltage conduction path (conduction path)
54: conductor body
55: tolerance absorbing part
61: wire harness
62: harness body
63: motor side connector (mounting part)
64: inverter side connector (mounting part)
65: high voltage conduction path (conduction path)
66: conductor body
67, 68: connecting part
69: mold part
70: tolerance absorbing part
81, 91: conductor body
82, 92: tolerance absorbing part

The invention claimed is:
1. A wire harness, comprising:
a conduction path including a conductor body and connecting parts provided at one end and the other end of the conductor body; and
a tolerance absorbing part which is provided in the conductor body, wherein the tolerance absorbing part is plastically deformed to allow a position of one connecting part provided at either of the one end and the other end of the conductor body to be displaced in X, Y and Z directions in a state where the other connecting part is fixed, and to hold a displaced state of the conduction path after a displacement, wherein the tolerance absorbing part has a lower rigidity than other portions of the conductor body, wherein a central axis of a first connecting part provided at one end of the conductor body and a central axis of a second connecting part provided at the other end of the conductor body extend in a first direction and are offset from each other with respect to a second direction that is perpendicular to the first direction, wherein a central axis of an interconnecting portion provided at a center portion of the conductor body extends in a third direction intersecting the first direction and the second direction to connect the first and second connecting parts, wherein the tolerance absorbing part is provided in the interconnecting portion and comprises a 90-degree twist and a 90-degree reverse twist, and wherein the third direction is an oblique direction with respect to the first direction and the second direction.

2. The wire harness according to claim 1, wherein the tolerance absorbing part is formed into any one of a mountain shape, a wavy shape and a twisted shape, or the tolerance absorbing part is formed by crushing the conductor body.

3. The wire harness according to claim 2, wherein a slit which extends in a direction which is substantially perpendicular to a conductor width direction is formed at a center of the tolerance absorbing part in the conductor width direction.

4. The wire harness according to claim 1, wherein a mold part which has insulation property and flexibility is provided outside the conductor body including the tolerance absorbing part.

5. The wire harness according to claim 4, wherein a plurality of conduction paths including the conduction path are aligned so that the tolerance absorbing parts of the plurality of conduction paths are arranged substantially in the same position, and mounting parts which include the connecting parts are provided at ends of the plurality of conduction paths.

6. The wire harness according to claim 1, wherein a plurality of conduction paths including the conduction path are aligned so that the tolerance absorbing parts of the plurality of conduction paths are arranged substantially in the same position, and mounting parts which include the connecting parts are provided at ends of the plurality of conduction paths.

7. The wire harness according to claim 1, wherein the conducting path is formed into a flat strip shape made of a metallic plate which has a predetermined conductor width and a predetermined thickness.

8. The wire harness according to claim 7, wherein the tolerance absorbing part is formed into a mountain shape or a wavy shape, a top of which is protruded in a direction of the thickness of the conducting path.

* * * * *